United States Patent

Hirata et al.

[11] Patent Number: 6,140,864
[45] Date of Patent: *Oct. 31, 2000

[54] CIRCUIT FOR CONTROLLING LEAKAGE CURRENT IN LARGE SCALE INTEGRATED CIRCUITS

[75] Inventors: Takashi Hirata; Toru Iwata; Hironori Akamatsu, all of Osaka, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/927,061

[22] Filed: Sep. 10, 1997

[30] Foreign Application Priority Data

Sep. 12, 1996 [JP] Japan .................. 8-241735

[51] Int. Cl.[7] ........................................ G05F 3/02
[52] U.S. Cl. ................................. 327/544; 327/530
[58] Field of Search ......................... 327/77, 78, 80, 327/362, 378, 530, 544

[56] References Cited

U.S. PATENT DOCUMENTS 4,929,884  5/1990  Bird et al. ........................ 323/313
5,408,144  4/1995  Sakata et al. ..................... 326/21
5,561,384  10/1996  Reents et al. ................... 327/108

FOREIGN PATENT DOCUMENTS 6208790  7/1994  Japan .

*Primary Examiner*—Terry D. Cunningham
*Attorney, Agent, or Firm*—McDermott, Will & Emery

[57] ABSTRACT

In an LSI circuit, respective voltages on power-source lines connected to the respective sources of transistors which are turned OFF in a circuit block in the standby state are controlled by a power-source-voltage control circuit to vary in response to variations in the threshold voltages of the transistors. Consequently, the differential voltage (Vgs–Vt) between the gate-to-source voltage Vgs of each of the transistors and the threshold voltage Vt thereof is held constant at a given value, so that an OFF-state leakage current flowing through the transistor in the circuit block in the standby state is reduced and held constant at a given value. What results is a reduction in the power consumption of the circuit block in the standby state.

10 Claims, 8 Drawing Sheets

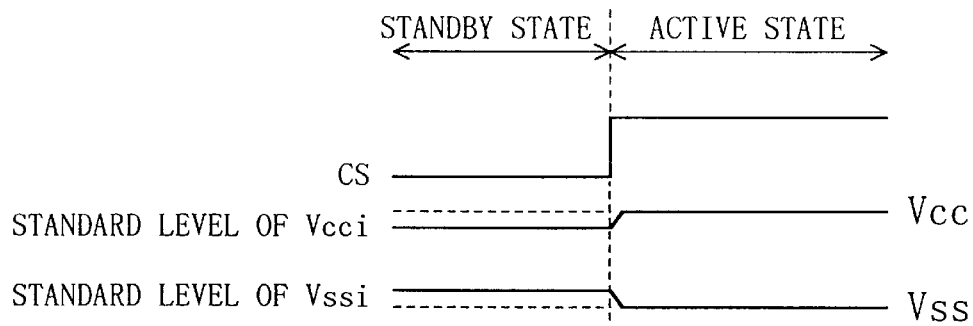
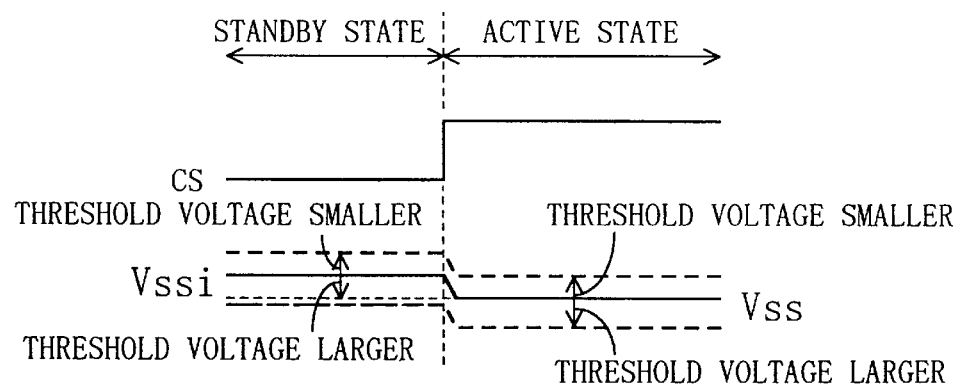
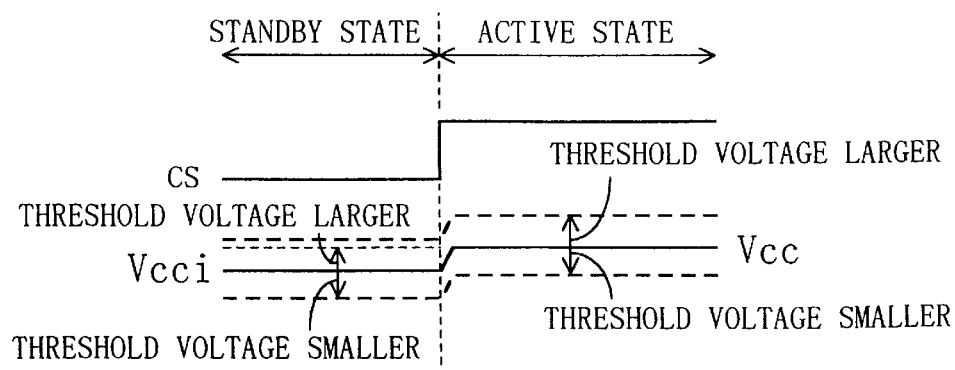

CIRCUIT FOR CONTROLLING LEAKAGE CURRENT IN LARGE SCALE INTEGRATED CIRCUITS

BACKGROUND OF THE INVENTION

The present invention relates to improvements in LSI circuits and, more particularly, in high-speed and low-power LSI circuits composed of extremely small elements.

With the widespread use of portable equipment in recent years, LSIs consuming lower power have been in greater demand. To implement a lower-power LSI, a power-source voltage used in the LSI has been lowered steadily. However, the lowering of the internal power-source voltage entails a rapid reduction in the operating speed of the circuit. To effectively overcome the problem, the threshold voltage of a transistor may be lowered (Low-Vt). When the threshold voltage of the transistor is lowered, a current flowing through the transistor is increased sufficiently to increase the operating speed thereof. However, a leakage current flowing through the transistor in the OFF state (OFF-state leakage current) is also increased disadvantageously in the standby or active state. Moreover, if a variation in manufacturing process for the transistor causes a variation in the threshold voltage thereof, the variation may greatly affect the lowered threshold voltage.

To overcome the problem of the OFF-state leakage current increased in the standby state, there has been proposed a technique disclosed in Japanese Laid-Open Patent Publication HEI 6-208790 whereby a potential at the source node of a transistor being cut off in the standby state is varied in such a direction as to decrease the leakage current so that the leakage current flowing through the circuit in the standby state is reduced.

However, since the conventional technique has varied the potential at the source node of the transistor on the assumption that the threshold voltage of the transistor is constant, serious problems occur if a variation in manufacturing process therefor or a temperature variation during the use of a finished product cause a variation in the threshold voltage of the transistor. Specifically, an increase in the threshold voltage of the transistor decreases the operating speed of the circuit, while a decrease in the threshold voltage of the transistor increases the leakage current flowing through the transistor in the OFF state.

SUMMARY OF THE INVENTION

It is therefore a first object of the present invention to provide an LSI circuit wherein an increase in leakage current or a decrease in operating speed resulting from a variation in the threshold voltage of a transistor is suppressed.

A second object of the present invention is to provide an LSI circuit wherein a leakage current flowing through a transistor is reduced not only in the standby state but also in the active state.

To attain the first object, the present inventors have focused attention on the fact that a leakage current flowing through a transistor is directly proportional to a differential voltage (Vgs–Vt) between the gate-to-source voltage Vgs of the transistor and the threshold voltage Vt thereof. By varying the gate-to-source voltage Vgs in response to a variation in threshold voltage Vt, i.e., by varying the source voltage (power-source voltage) of the transistor, a leakage current flowing through the transistor in the OFF state can be reduced and held constant at a given value.

To attain the second object, the present invention forcibly replaces a part of the duration of the active state of a circuit with a specified period during which a temporary lower-power state is sustained.

Specifically, an LSI circuit according to the present invention is switchable between an active state and a standby state and comprises: a transistor being cut off in the standby state; a power-source line connected to the transistor; and a power-source-voltage control circuit for causing a voltage on the power-source line to vary in response to a variation in a threshold voltage of the transistor.

Alternatively, the LSI circuit according to the present invention has a circuit block switchable between an active state and a standby state and comprises: a power-consumption reducing circuit for reducing power consumption of the LSI circuit in the standby state compared with that in the active state; and an artificial-standby-state generating circuit for forcibly replacing a part of the duration of the active state with a specified period during which a temporary artificial standby state is sustained, the artificial standby state being equal to the standby state with power consumption reduced by the power-consumption reducing circuit.

With the arrangements according to the present invention, the voltage on the power-source line connected to the transistor being cut off in the standby state varies with a variation in the threshold voltage of the transistor, so that the gate-to-source voltage of the transistor is held constant at a given value even when a variation in manufacturing process causes a variation in the threshold voltage of the transistor. Consequently, the OFF-state leakage current flowing through the transistor in the standby state can be reduced to a small value.

Additionally, when the circuit is in the active state, the present invention forcibly replaces a part of the duration of the active state of the circuit with a specified period during which a temporary artificial standby state is sustained by means of the artificial-standby-state generating circuit, so that lower power consumption is achieved even in the active state.

BRIEF DESCRIPTION OF THE DRAWINGS

The accompanying drawings illustrate the preferred embodiments of the present invention, In the drawings:

FIG. 3(a) illustrates the respective standard levels of voltages on third and fourth power-source lines in the LSI circuit according to the first embodiment;

FIG. 3(b) illustrates control for varying the voltage on the fourth power-source line Vssi;

FIG. 3(c) illustrates control for varying the voltage on the third power-source line Vcci;

DETAILED DESCRIPTION OF THE INVENTION

Figure 1:
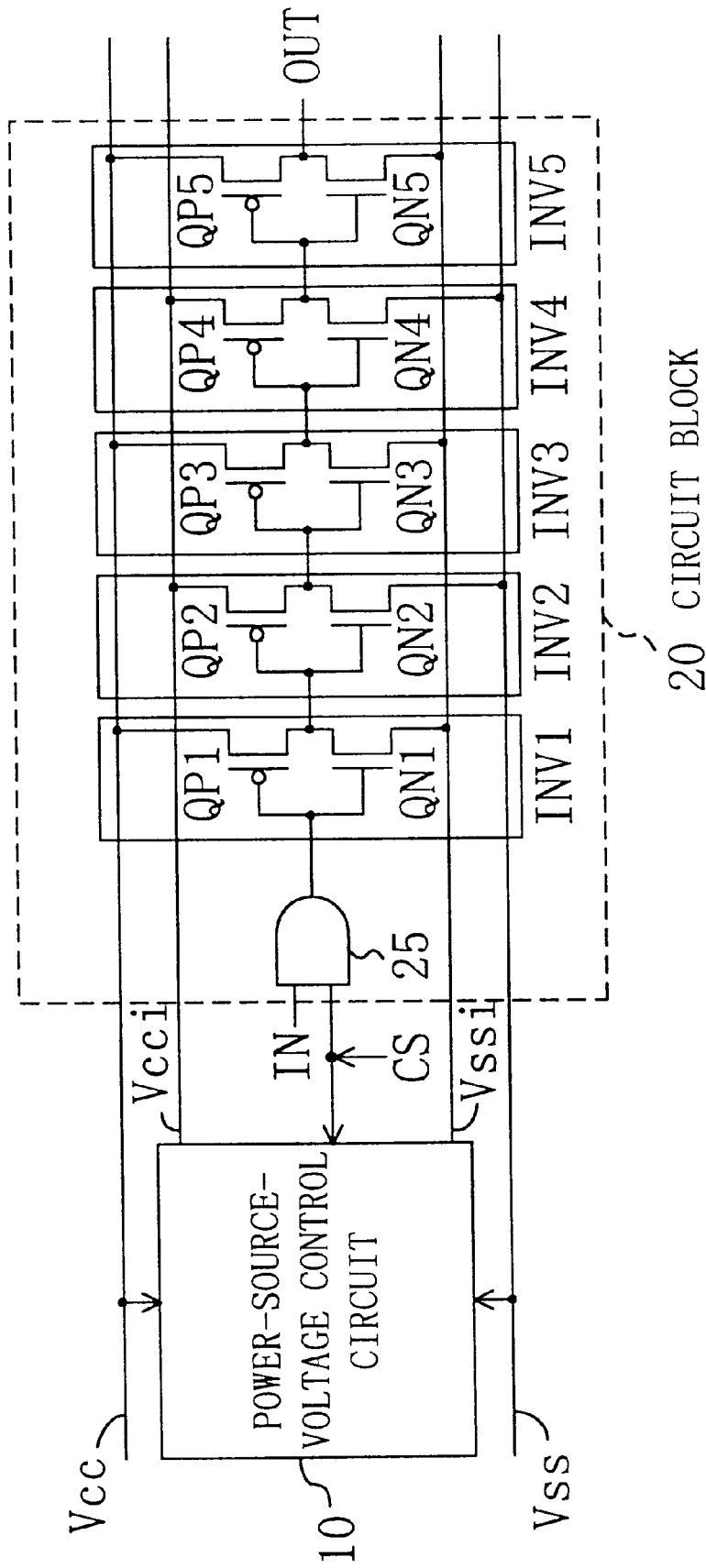
FIG. 1 shows an LSI circuit according to a first embodiment of the present invention.

Referring now to the drawings, the embodiments of the present invention will be described.

First Embodiment

FIG. 1 shows an LSI circuit according to a first embodiment of the present invention.

In the drawing are shown: a first power-source line Vcc having a voltage of, e.g., 1.0 V; a second power-source line Vss as a ground line; a third power-source line Vcci; a fourth power-source line Vssi; a chip activate signal CS; and inverter circuits INV1 to INV5 composed of PMOS transistors QP1 to QP5 and NMOS transistors QN1 to QN5 connected in series in a one-to-one relationship.

A circuit block 20 is composed of an AND circuit 25 for performing an AND operation between an input signal IN and the chip activate signal CS and of a circuit consisting of the inverter circuits INV1 to INV5 connected in cascade. When the chip activate signal CS is HIGH, the AND circuit 25 inputs the input signal IN to the first inverter circuit INV1, thereby bringing the circuit block 20 into the active state. When the chip activate signal CS is LOW, the AND circuit 25 prevents the input signal IN from being inputted to the first inverter circuit INV1, thereby bringing the circuit block 20 into the standby state.

Although the present embodiment will be described by using the inverter circuits INV1 to INV5 as examples, any logic circuit composed of at least an NMOS transistor or a PMOS transistor may be used instead.

In each of the inverter circuits INV1 to INV5 in the circuit block 20, when the circuit block 20 is in the standby state, i.e., when the chip activate signal CS is LOW, an output from the logic circuit 25 and input signals to the first, third, and fifth inverter circuits INV1, INV3, and INV5 become LOW, while input signals to the second and fourth inverter circuits INV2 and INV4 become HIGH. Accordingly, the NMOS transistors QN1, QN3, QN5 and the PMOS transistors QP2 and QP4 are turned OFF in the standby state. To alter the gate-to-source voltage Vgs of each of the NMOS transistors QN1, QN3, and QN5, the fourth power-source line Vssi is connected to the respective sources of the NMOS transistors. To alter the gate-to-source voltage Vgs of each of the PMOS transistors QP2 and QP4, the third power-source line Vcci is connected to the respective sources of the PMOS transistors.

To vary respective voltages on the third and fourth power-source lines Vcci and Vssi, a power-source-voltage control circuit 10 is provided. The power-source-voltage control circuit 10 actually detects the threshold voltage of transistors QP1, QP1' and the corresponding n-channel transistors in detecting circuits 100a and 100b in FIG. 4.

FIGS. 3 show the respective waveforms of the voltages on the third and fourth power-source lines Vcci and Vssi controlled by the power-source-voltage control circuit 10. As shown in FIG. 3(a), the standard level of the voltage on the third power-source line Vcci is adjusted to be equal to the voltage on the first power-source line Vcc in the active state, while it is adjusted to be slightly lower than the standard level in the standby state for the purpose of reducing a leakage current. On the other hand, the standard level of the voltage on the fourth power-source line Vssi is adjusted to be equal to the voltage on the second power-source line Vss in the active state, while it is adjusted to be slightly higher than the standard level in the standby state for the purpose of reducing the leakage current. With the arrangement, the gate-to-source voltages of the transistors QN1, QN3, QN5, QP2, and QP4 which are turned OFF in the standby state become negative and the differential voltage (Vgs−Vt) between each of the gate-to-source voltages Vgs and the threshold voltage Vt is also reduced. Consequently, the leakage current flowing through the transistor in inverse proportion to the differential voltage is reduced and hence the amount of leakage current allowed to flow in the standby state becomes smaller than that in the active state, resulting in lower power consumption.

As described above, the fourth power-source line Vssi is connected to the inverter circuits INV1, INV3, and INV5 each receiving a LOW input in the standby state. When the threshold voltage Vtn of each of the NMOS transistors QN1 to QN5 in the circuit block 20 increases to be higher than a desired value due to a variation in manufacturing process, the voltage on the fourth power-source line Vssi is controlled by the power-source-voltage control circuit 10 to be lower than the standard level indicated by the solid line by the increase in threshold voltage, as shown in FIG. 3(b). As a result, the gate-to-source voltage Vgs of each of the NMOS transistors QN1 to QN5 increases accordingly by the increase in the threshold voltage Vtn thereof in each of the active and standby states, so that the difference (Vgs−Vtn) between the gate-to-source voltage Vgs of the NMOS transistor and the threshold voltage Vtn thereof is held constant. What results is the effect of suppressing the leakage current in the standby state and achieving operation at a constant speed in the active state.

Likewise, when the threshold voltage Vtn of each of the NMOS transistors QN1 to QN5 composing the inverter circuits in the circuit block 20 decreases to be lower than the desired value due to a variation in manufacturing process, the voltage on the fourth power-source line Vssi is controlled by the power-source-voltage control circuit 10 to be higher than the standard level by the decrease in threshold voltage, as shown in FIG. 3(b). As a result, the gate-to-source voltage Vgs of each of the NMOS transistors QN1 to QN5 decreases accordingly by the decrease in the threshold voltage Vtn thereof in each of the active and standby states, so that the difference (Vgs−Vtn) between the gate-to-source voltage Vgs of the NMOS transistor and the threshold voltage Vtn thereof is held constant. What results is the effect of suppressing the leakage current in the standby state and enabling the inverter circuits to operate at a constant speed with improved performance.

In the LSI circuit according to the present embodiment, no particular compensation has been provided for the threshold voltage of each of the PMOS transistors QP1, QP3, and QP5 composing the inverter circuits INV1, INV3, and INV5 each receiving a LOW input in the standby state. This is because the present embodiment has adopted a circuit configuration in which the leakage current flowing through the NMOS transistors QN1, QN3, and QN5 determines the leakage current flowing through the LSI circuit in the standby state and the operating speed (ON-state current) of each of the NMOS transistors determines the operating speed of the LSI circuit in the active state.

On the other hand, the third power-source line Vcci is connected to the inverter circuits INV2 and INV4 each receiving a HIGH input in the standby state, as described above. When the threshold voltage Vtp of each of the PMOS transistors QP1 to QP5 in the circuit block 20 increases to be higher than a desired value due to a variation in manufacturing process, the voltage on the third power-source line Vcci is controlled by the power-source-voltage control circuit 10 to be higher than the standard level indicated by the solid line by the increase in threshold voltage, as shown in FIG. 3(c). Conversely, when the threshold voltage Vtp of each of the PMOS transistors QP1 to QP5 decreases to be lower than the desired value, the voltage on the third power-source line Vcci is controlled by the power-source-voltage control circuit 10 to be lower than the standard level indicated by the solid line by the decrease in threshold voltage. As a result, the gate-to-source voltage Vgs of each of the PMOS transistors QP1 to QP5 varies accordingly by the variation in the threshold voltage Vtp thereof in each of the active and standby states, so that the difference (Vgs–Vtp) between the gate-to-source voltage Vgs of the PMOS transistor and the threshold voltage Vtp thereof is held constant. What results is the effect of suppressing the leakage current in the standby state and achieving operation at a constant speed in the active state.

Figure 4:
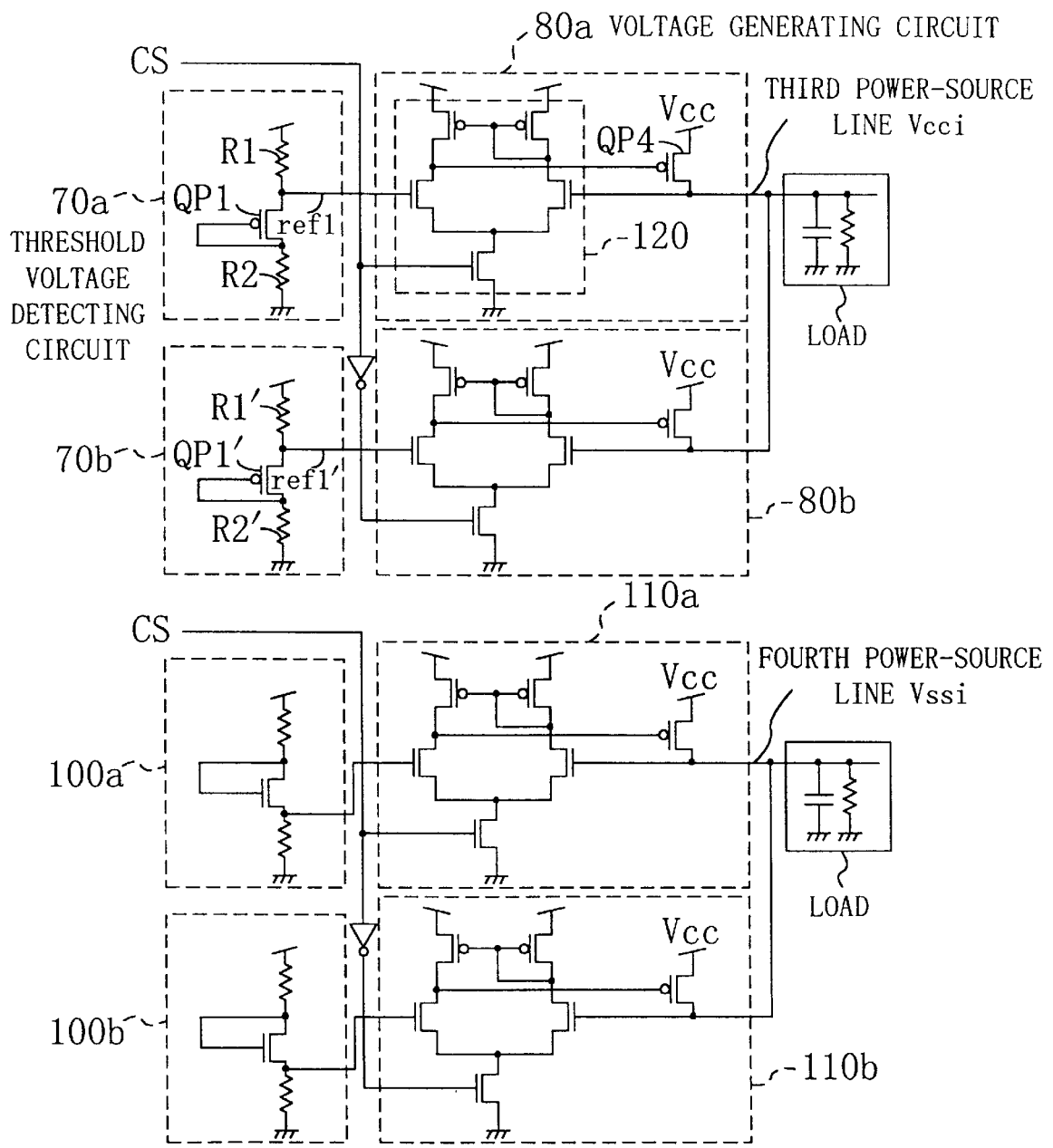
FIG. 4 shows the internal structure of a power-source-voltage control circuit provided in the LSI circuit according to the first embodiment.

FIG. 4 shows a specific example of the power-source-voltage control circuit 10. The power-source-voltage control circuit 10 may have any circuit configuration provided that the operation described above is performed satisfactorily. The power-source-voltage control circuit 10 comprises: two threshold-voltage detecting circuits 70a and 70b and two voltage generating circuits 80a and 80b, each for generating the voltage on the third power-source line Vcci; two threshold-voltage detecting circuits 100a and 100b and two voltage generating circuits 110a and 110b, each for generating the voltage on the fourth power-source line Vssi. The threshold-voltage detecting circuits 70a and 100a and voltage generating circuits 80a and 110a are for use in the active state. The threshold-voltage detecting circuits 70b and 100b and voltage generating circuits 80b and 110b are for use in the standby state. FIG. 4 also shows the chip activate signal CS for switching between the standby state and the active state, similarly to FIG. 1. When the chip activate signal CS is LOW, switching is performed to the threshold-voltage detecting circuits 70b and 100b and voltage generating circuits 80b and 110b for use in the standby state. When the chip activate signal CS is LOW, switching is performed to the threshold-voltage detecting circuits 70a and 100a and voltage generating circuits 80a and 110a for use in the active state.

The power-source-voltage control circuit 10 performs the basic operation of producing a potential proportional to the threshold voltage of the transistors QN1 to QN5 or of the transistors QP1 to QP5 by means of the threshold-voltage detecting circuits 70a, 70b, 100a, and 100b, holding the produced potential by means of the voltage generating circuits 80a, 80b, 110a, and 110b, and outputting the held potential as the voltage on the third power-source line Vcci or as the voltage on the fourth power-source line Vssi. The operation will be described below in greater detail.

If the description is given to the threshold-voltage detecting circuits 70a and 80a used in the active state to control the voltage on the third power-source line Vcci in FIG. 4, the potential at the node ref1 of the threshold-voltage detecting circuit 70a is determined by a ratio of the resistance of each of two resistors R1 and R2 in the threshold-voltage detecting circuit 70a to the threshold voltage of the transistor QP1 for threshold-voltage detection. The transistor QP1 for threshold-voltage detection has been manufactured in the same process for manufacturing the transistors QP1 to QP5 and QN1 to QN5 in the circuit block 20. The potential at the node ref1 increases or decreases with an increase or a decrease in the threshold voltage of the transistor QP1 for threshold-voltage detection. The resistance values of the resistors R1 and R2 are determined such that the potential at the node ref1 at room temperature is on the standard level of the voltage on the third power-source line Vcci in the active state as shown in FIG. 3(a). The voltage generating circuit 80a is composed of a current mirror circuit 120 and a charge transistor QP4. By controlling the turning ON and OFF of the charge transistor QP4 by means of the current mirror circuit 120, the voltage on the third power-source line Vcci can be held at the potential at the node ref1. Consequently, the potential at the node ref1 increases or decreases with an increase or a decrease in the threshold voltage of the transistor QP1 for threshold-voltage detection, which varies the voltage Vcci on the third power-source line Vcci accordingly.

In the threshold-voltage detecting circuit 70b for use in the standby state, the resistance values of two resistors R1' and R2' are determined such that the potential at a node ref1' is on the standard level of the voltage Vcci on the third power-source line in the standby state. This permits the voltage generating circuit 80b to generate the voltage on the third power-source line Vcci in the standby state. As for the structures and operations of the threshold-voltage generating circuits 100a and 100b and voltage generating circuits 110a and 110b, they are the same as described above, so that the description thereof will be omitted.

By incorporating the power-source-voltage control circuit 10 shown in FIG. 4 into a chip, even when the threshold voltage of the transistor in the circuit block 20 varies with a variation in manufacturing process, the voltage on the third power-source line Vcci and the voltage on the fourth power-source line Vssi can be varied in response to the varied threshold voltage. Moreover, even when the threshold voltage of the transistor in the circuit block 20 varies with a temperature variation during the use of the circuit block 20, the voltage on the third power-source line Vcci and the voltage on the fourth power-source line Vssi can be varied excellently.

Although the power-source-voltage control circuit 10 comprising the transistor QP1 for threshold-voltage detection has been provided in the present embodiment to vary the voltages on the third and fourth power-source lines Vcci and Vssi in response to a variation in the threshold voltage of the transistor resulting from a temperature variation during the use of the circuit block 20, it is also possible to preliminarily measure the threshold voltage of a transistor embedded in each chip and control the voltages on the third and fourth power-source lines Vcci and Vssi based on information representing the threshold voltage. In this case, however, the power-source voltage cannot be controlled in response to a variation in threshold voltage resulting from a temperature variation.

Figure 2:
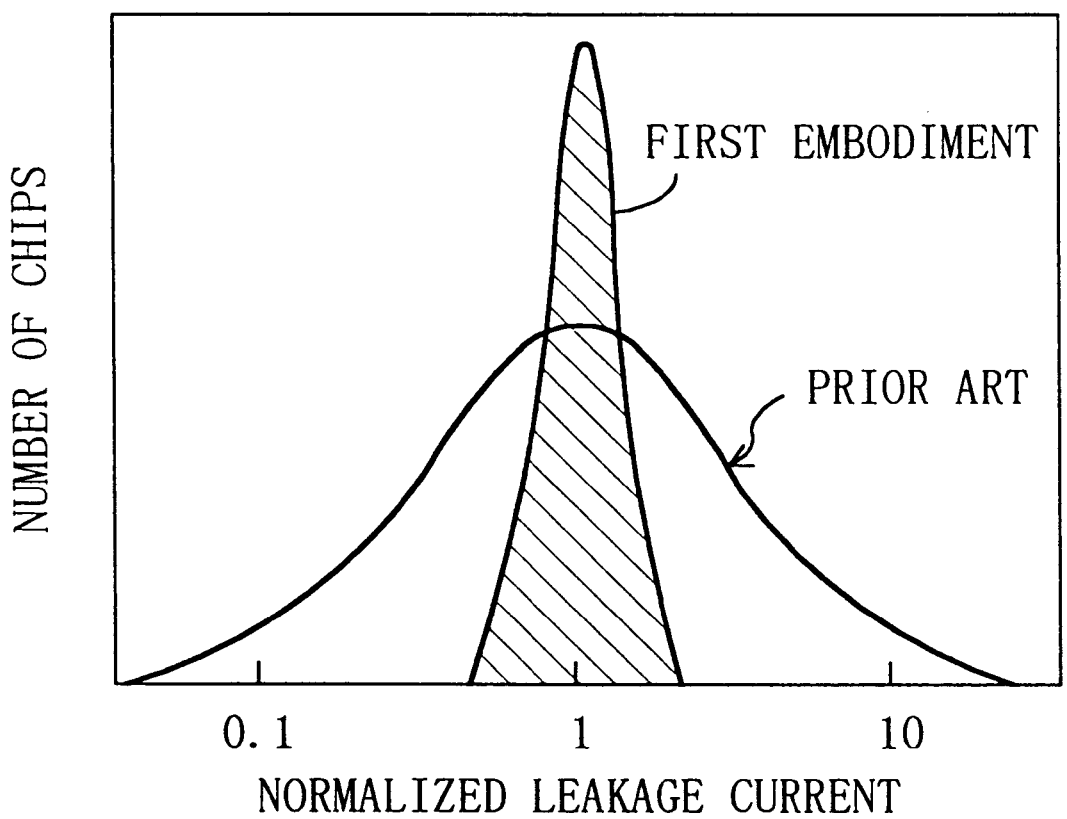
FIG. 2 shows the distribution of a leakage current in the LSI circuit according to the first embodiment.

FIG. 2 illustrates the effect achieved by the LSI circuit according to the present embodiment. In the distribution shown in FIG. 2, a horizontal axis represents a normalized leakage current and a vertical axis represents the number of chips. On the horizontal axis representing the normalized leakage current, a value of "1" indicates an excellent chip in which a tradeoff between the operating speed of a circuit and a leakage current flowing therethrough has been achieved satisfactorily. A value smaller than "1" indicates a chip in which the threshold voltage of a transistor is high and a leakage current flowing therethrough is small, while the operation speed thereof is low. On the other hand, a value larger than "1" indicates a chip in which the threshold voltage of a transistor is low and the operating speed thereof is high, while a leakage current flowing therethrough is large. As shown in FIG. 2, a variation in leakage current is large in the conventional case where the power-source-voltage control circuit 10 according to the present embodiment is not used. By contrast, a variation in leakage current is suppressed in the case where the power-source-voltage control circuit 10 according to the present embodiment is used. The drawing shows the effects achieved by the present embodiment, which are the voltage (Vgs−Vt) held constant at a given value, the suppressed leakage current, and the stable operating speed.

Second Embodiment

Below, a second embodiment of the present invention will be described.

Figure 5:
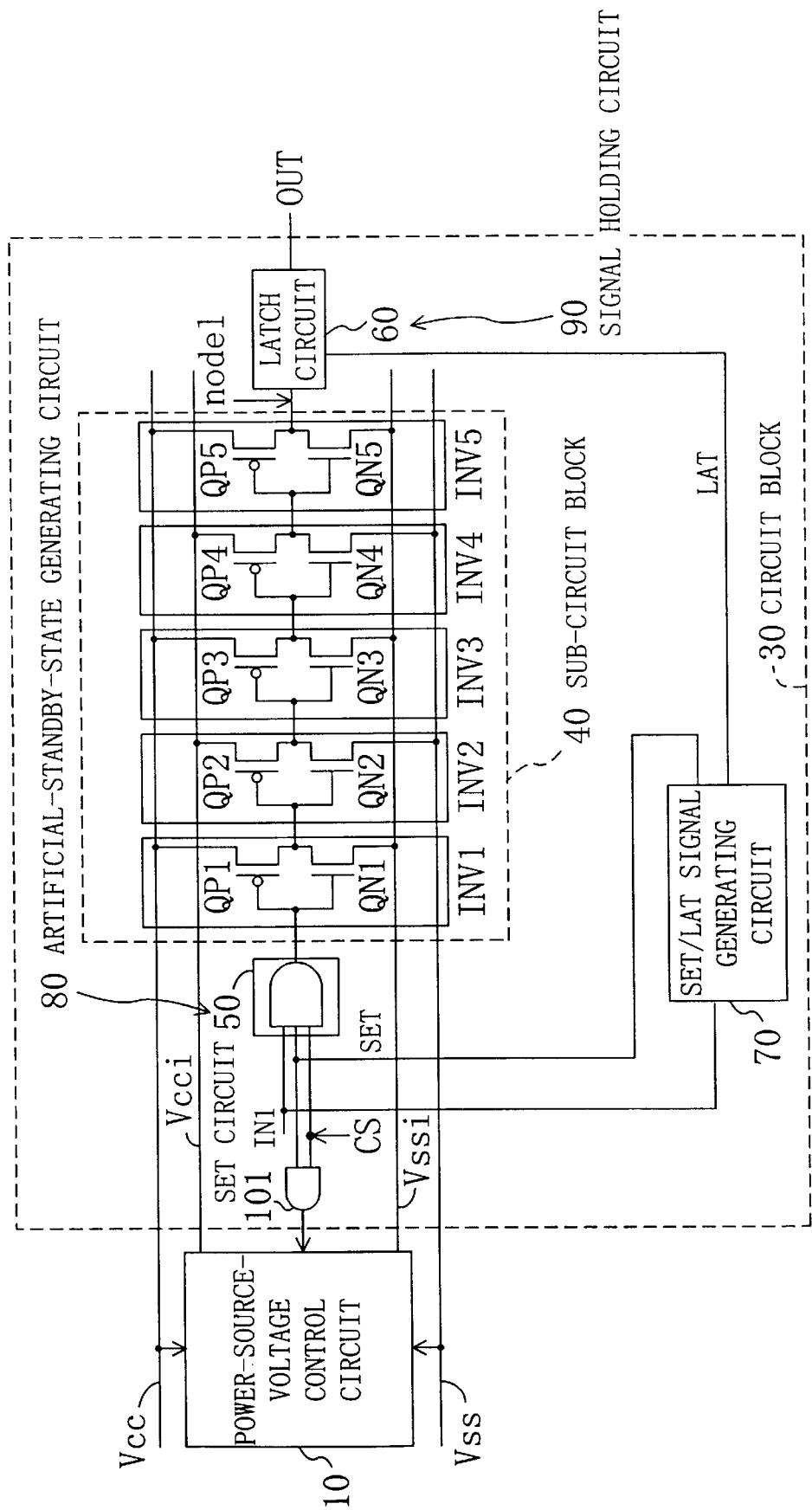
FIG. 5 shows an LSI circuit according to a second embodiment of the present invention.
Figure 6:
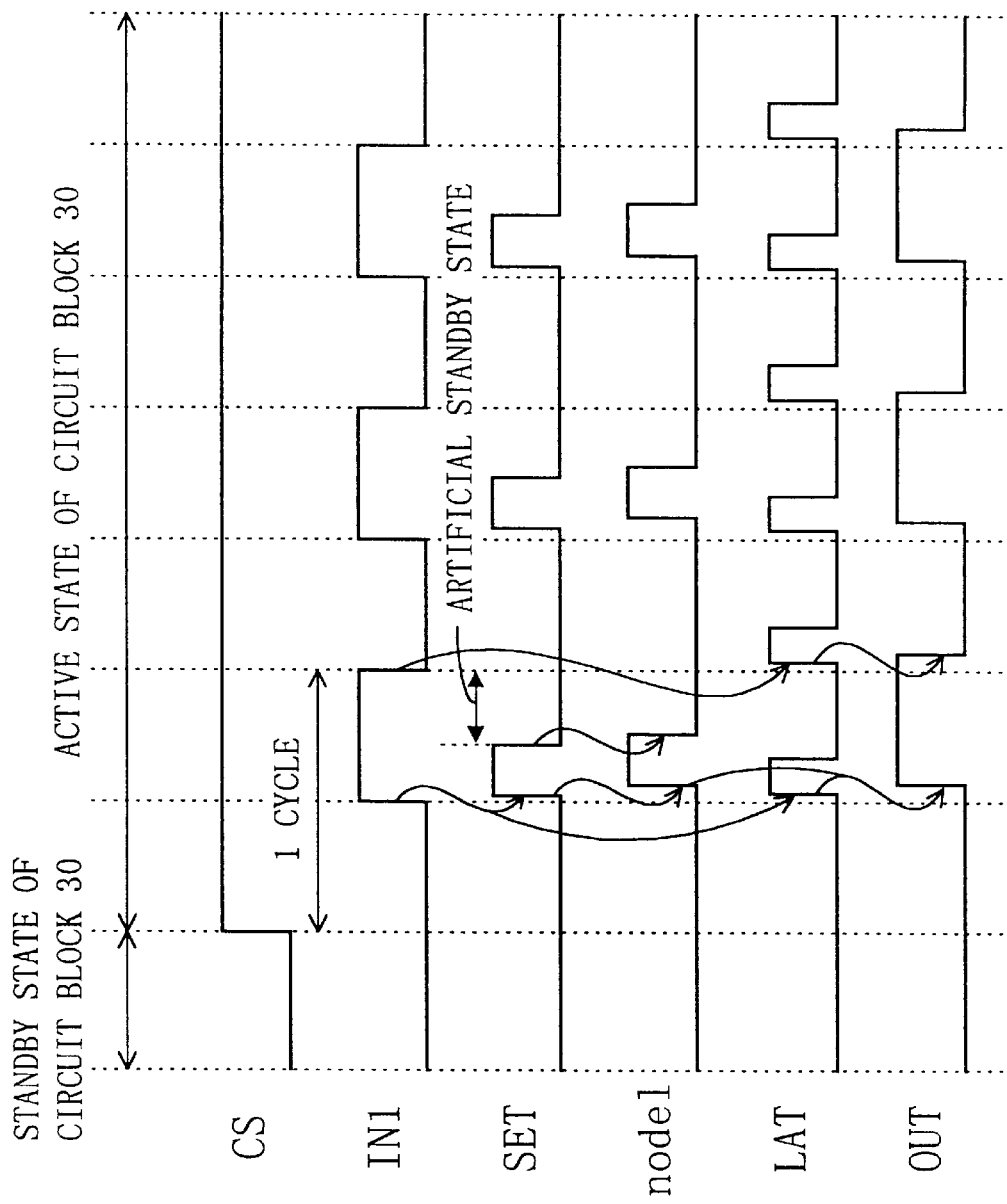
FIG. 6 shows an operational timing for the LSI circuit according to the second embodiment.

FIG. 5 shows an LSI circuit according to the second embodiment of the present invention. FIG. 6 is an operational timing chart for the LSI circuit shown in FIG. 5. In contrast to the first embodiment in which the leakage current has been reduced in the standby state, the present embodiment reduces the leakage current in the active state as well.

The LSI circuit shown in FIG. 5 comprises: a power-source-voltage control circuit 10; first to fourth power-source lines Vcc, Vss, Vcci, and Vssi; and a circuit block 30. The power-source-voltage control circuit (power-consumption reducing circuit) 10 has the same structure as shown in FIG. 1 illustrating the first embodiment. The circuit block 30 is composed of a sub-circuit block 40 consisting of NMOS transistors and PMOS transistors, a set circuit 50, a latch circuit 60, a SET/LAT signal generating circuit (signal generating circuit) 70, and an AND circuit 101. The AND circuit 101 receives a chip activate signal CS and a set signal SET which is outputted from the SET/LAT signal generating circuit 70, and the power-source-voltage control circuit 10 is controlled by an output signal from the AND circuit 101. The set circuit 50 is composed of an AND circuit which receives an input signal IN1, a set signal SET, and the chip activate signal CS, performs an AND operation between the signals, and outputs a signal representing the result of the AND operation to the sub-circuit block 40. The latch circuit 60 is controlled by a latch signal LAT, latches an output signal from the output node node1 of the sub-circuit block 40, and outputs the latched signal from the output terminal OUT thereof. The SET/LAT signal generating circuit (signal generating circuit) 70 receives the input signal IN1 and generates the set signal SET and the latch signal LAT based on the input signal IN1.

The operation of the LSI circuit according to the present embodiment will be described with reference to FIGS. 5 and 6.

In the LSI circuit, the sub-circuit block 40 is switched between the active state and the standby state by the chip activate signal CS. When the sub-circuit block 40 is brought into the active state by the chip activate signal CS on the HIGH level, the input signal IN1 and the set signal SET are inputted to the input terminal of the set circuit 50, while the latch circuit LAT is inputted to the latch circuit 60.

When the set signal SET is LOW, the output from the set circuit 50 is fixed to the LOW level irrespective of the level of the chip activate signal CS so that the sub-circuit block 40 is brought into the standby state. To suppress the leakage current in the standby state to a specified value, the power-source-voltage control circuit 10 controls the levels of the voltages on the third and fourth power-source lines Vcci and Vssi in the same manner as described in the first embodiment. In the sub-circuit block 40 in the active state, when input signals to the inverter circuits INV1, INV3, and INV5 are HIGH and input signals to the other inverter circuits INV2 and INV4 are LOW, the leakage current flows through the MOS transistors QP1, QN2, QP3, QN4, and QP5, so that it is impossible to suppress the leakage current in the active state only with the structure of the sub-circuit block 40.

On the other hand, if the input signal IN1 is inputted to the set circuit 50 when the chip activate signal CS is HIGH and the set signal SET is HIGH, the input signal IN1 is inputted to the sub-circuit block 40 through the set circuit 50. The signal inputted to the sub-circuit block 40 propagates therein, while changing the state of the internal node node1, to be inputted to the latch circuit 60. The signal inputted to the latch circuit 60 is latched thereby only when the latch signal LAT becomes HIGH and the voltage at the output terminal OUT presents the waveform as shown in FIG. 6. On the latching of the signal by the latch circuit 60, the set signal SET from the set circuit 50 makes a transition from the HIGH level to the LOW level and an output from the latch circuit 60 does not vary even when an output from the set circuit 50 is forced to shift to the LOW level.

Thus, in the LSI circuit according to the present embodiment, the sub-circuit block 40 is brought into the active state when the chip activate signal CS is HIGH and the SET signal is HIGH. However, the sub-circuit block 40 is brought into the standby state when the SET signal becomes LOW, so that the internal node is fixed to the LOW level. Further, the power-source-voltage control circuit 10 operates in the active state in the same manner as in the standby state because an output from the AND circuit 101 is set to a low state. If the period during which the set signal SET is HIGH is set shorter than the period during which the input signal IN1 is HIGH, then, it becomes possible to forcibly replace a part of the duration of the active state of the sub-circuit block 40 with a specified period during which a temporary artificial standby state is sustained. The set circuit 50, the AND circuit 101 and the SET/LAT signal generating circuit 70 compose an artificial-standby-state generating circuit 80. Even during the period in which the artificial standby state is sustained, the sub-circuit block 40 apparently remains in the active state since the output signal from the sub-circuit block 40 is latched by the latch circuit 60. The latch circuit 60 and the SET/LAT signal generating circuit 70 compose a signal holding circuit 90 for holding the output signal from the sub-circuit block 40 in the artificial standby state.

Since the artificial standby state is identical with the standby state, the OFF-state leakage current passing through the transistors composing the sub-circuit block 40 can be suppressed during the period in which the temporary artificial standby state is sustained in the midst of the active state of the sub-circuit block 40 and hence an increase in power consumption can be suppressed in the active state, as described in the first embodiment.

Figure 7:
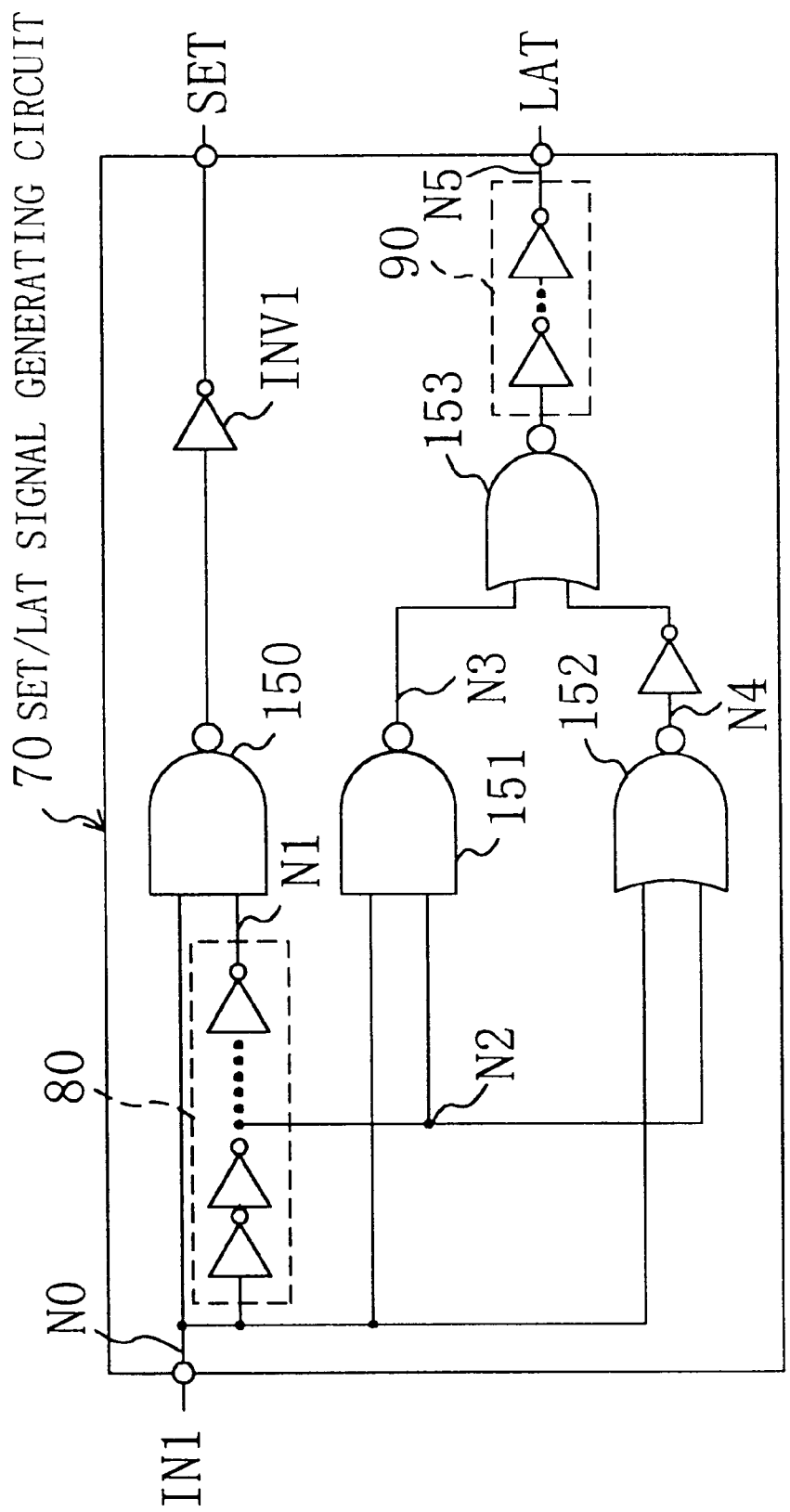
FIG. 7 shows the internal structure of a SET/LAT signal generating circuit provided in the LSI circuit according to the second embodiment.

FIG. 7 shows a specific structure of the SET/LAT signal generating circuit 70. In the drawing, the SET/LAT signal generating circuit 70 receives the input signal IN1 to the set circuit 50, detects the input signal IN on the HIGH level, and generates the set signal SET and the latch signal LAT.

Figure 8:
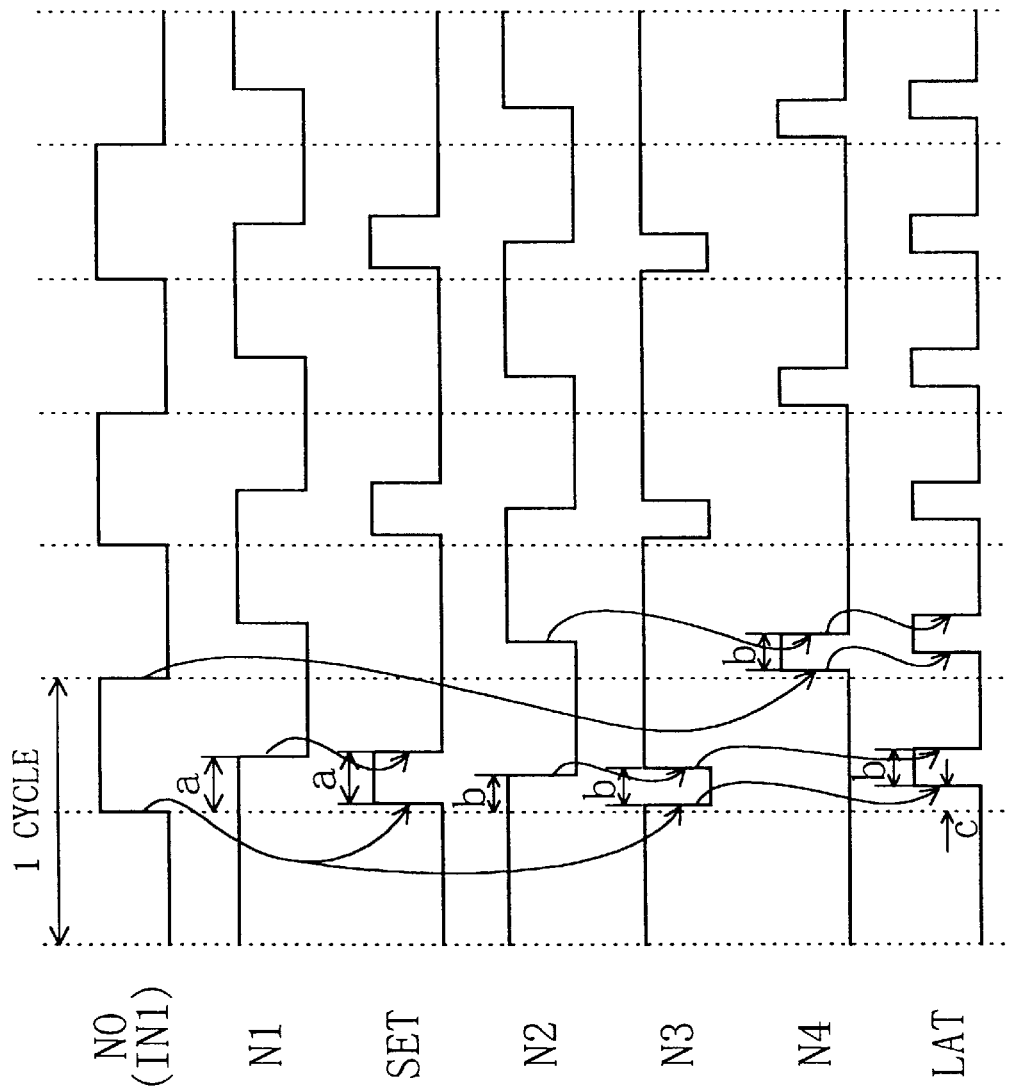
FIG. 8 shows an operational timing for the SET/LAT signal generating circuit according to the second embodiment.

FIG. 8 is an operational timing chart for the SET/LAT signal generating circuit 70. The internal structure of the SET/LAT signal generating circuit 70 shown in FIG. 7 will be described with reference to the timing chart of FIG. 8. In FIG. 7, delay circuits 80 and 90 each composed of an inverter chain control the timing for a signal at each of nodes N1, N2, and N5. The delay circuit 80 is composed of an odd number of inverters, while the delay circuit 90 is composed of an even number of inverters. The nodes N1 and N2 are the output terminals of the odd-numbered inverters from the input terminal N0 to which the input signal IN1 is inputted.

When the input signal IN1 is inputted to the node N0, signals obtained by delaying the input signal IN1 by a time a and a time b propagate to the nodes N1 and N2. The two times a and b are adjusted by changing the number of inverters composing the delay circuit 80. A NAND circuit 150 generates a LOW pulse during the time a, which is inverted by the inverter INV1 so that the SET signal on the HIGH level is generated during the period a.

On the other hand, a NAND circuit 151 and a NOR circuit 152 generate respective pulses each having a width corresponding to the time b at nodes N3 and N4. A NOR circuit 153 receives an output from the NAND circuit 15 and an output from the NOR circuit 152 which has been inverted by the inverter INV2 and produces an output signal, which passes through the delay circuit 90 to form the latch signal LAT. The timing for the latch signal LAT can be adjusted by changing the number of inverters composing the delay circuit 90. Of the latch signal LAT, the pulse generated by the NAND circuit 151 is a signal for latching a pulse from the output node node1 of the sub-circuit block 40. The pulse generated by the NOR circuit 152 is for resetting the potential at the output node OUT of the latch circuit 60.

The SET/LAT signal generating circuit 70 enables automatic generation of operational timings for the set circuit 50 and latch circuit 60 based on the input signal IN1. In the case where the input signal IN1 does not vary, the signal generating circuit does not operate, which achieves far lower power consumption. The SET/LAT signal generating circuit 70 shown in FIG. 7 may have any configuration provided that the same operation is performed thereby.

What is claimed is:

1. An LSI circuit comprising:
    a circuit block including a transistor and being switchable between an active state in which a predetermined signal is inputted and a standby state in which inputting of said predetermined signal is prevented;
    a power-source line connected to said circuit block, for supplying a voltage to said circuit block;
    a reference transistor circuit having a reference transistor having a threshold voltage Vt which varies in accordance with a threshold voltage of said transistor included in said circuit block; and
    a power-source-voltage control circuit connected to said reference transistor circuit, said power-source-voltage control circuit controlling a potential of said power-source line,
    wherein
    said transistor included in said circuit block includes a source connected to said power-source line and a gate to which a potential having a value preset based on a configuration of said circuit block placed in said standby state is inputted,
    said transistor included in said circuit block is cut off during said standby state of said circuit block because of a variation in a gate-to-source voltage Vgs thereof which occurs when said potential is inputted to said gate,
    said power-source-voltage control circuit detects the threshold voltage Vt of said reference transistor and varies the potential of said power-source line such that a differential voltage (Vgs−Vt) between the gate-to-source voltage Vgs of said transistor and the detected threshold voltage Vt of said reference transistor is held constant at a given value in both of said active state and said standby state.

2. An LSI circuit according to claim 1, wherein said power-source-voltage control circuit causes the voltage on said power-source line to vary in response to the variation in the threshold voltage of said transistor resulting from a variation in a manufacturing process for said transistor.

3. An LSI circuit according to claim 1, wherein
    the voltage on said power-source line is set to a first level in said active state and to a second level in said standby state.

4. An LSI circuit comprising:
    a circuit block including a transistor, said circuit block entering an active state and becoming operable in accordance with an input signal when an activate signal is received, while entering a standby state and halting operation irrespective of said input signal when said activate signal is not received;
    a power-source line connected to said circuit block, for supplying a voltage to said circuit block; and
    a power-consumption reducing circuit connected to said circuit block, for controlling a potential of said power-source line,
    said transistor included in s aid circuit block including a source connected to said power-source line and a gate to which a potential having a value preset based on a configuration of said circuit block placed in said standby state is inputted, and
    said transistor included in said circuit block being cut off during said standby state of said circuit block be cause of variation in a gate-to-source voltage Vgs thereof which occurs when said potential is inputted to said gate,
    said LSI circuit further comprising
    an artificial-standby-state generating circuit connected to said power-consumption reducing circuit and the circuit block, said artificial-standby-state generating circuit being operable for forcing said circuit block into entering said standby state, holding an output signal of said circuit block, and causing said power-consumption circuit to operate when a voltage level of said input signal received by said circuit block is kept constant at a given value even if said activate signal instructs said circuit block to enter said active state, thereby to reduce an amount of a leakage current flowing through said circuit block,
    wherein
    said power-consumption reducing circuit varies the potential of said power-source line during said standby state such that the gate-to-source voltage Vgs of said transistor included in said circuit block placed in said standby state is smaller than that in said active state, to control an amount of a current flowing throughout said circuit block placed in said standby state so as to be smaller than that in said active state, thereby reducing power consumption.

5. An LSI circuit according to claim 4, wherein
    said power-source-voltage control circuit causes the voltage on said power-source line to vary such that the differential voltage (Vgs−Vt) is held constant at a given value.

6. An LSI circuit according to claim 5 or 4, wherein said artificial-standby-state generating circuit comprises:

a signal generating circuit for generating a set signal; and a set circuit for forcibly suspending said circuit block from operating when a supply of the set signal from said signal generating circuit is halted during the active state of said circuit block;

wherein the set signal is inputted into said power-consumption reducing circuit, and said power-consumption reducing circuit operates when a supply of the set signal is halted during the active state of said circuit block.

7. An LSI circuit according to claim 4, further comprising a signal holding circuit for holding, in said artificial standby state of said circuit block, a value of a signal outputted from said circuit block immediately before said circuit block enters the artificial standby state.

8. An LSI circuit according to claim 7, wherein said signal holding circuit comprises:

a signal generating circuit for generating a latch signal for holding an output signal from said circuit block in said active state of said circuit block; and a latch circuit for latching the output signal from said circuit block upon receipt of the latch signal from said signal generating circuit.

9. An LSI circuit according to claim 4, where in the voltage on said power-source line is set to a first level in said active state of said circuit block and to a second level in said standby state of said circuit block.

10. An LSI circuit according to claim 6, wherein said signal generating circuit receives an input signal to said circuit block and generates the set signal or a latch signal based on the input signal.

* * * * *